United States Patent
Van Der Burg

(10) Patent No.: US 6,443,349 B1
(45) Date of Patent: Sep. 3, 2002

(54) DEVICE AND METHOD FOR INSERTING AN INFORMATION CARRIER

(76) Inventor: William Van Der Burg, Pickéstraat 25B, NL-2201 EP Noordwijk (NL)

( * ) Notice: Subject to any disclaimer, the term of this patent is extended or adjusted under 35 U.S.C. 154(b) by 0 days.

(21) Appl. No.: 09/624,338

(22) Filed: Jul. 24, 2000

(30) Foreign Application Priority Data

Jul. 22, 1999 (NL) .............................................. 1012677

(51) Int. Cl.[7] .................................................. B27F 7/00
(52) U.S. Cl. ........................ 227/112; 227/114; 227/147; 53/396; 53/252
(58) Field of Search ........................... 53/396, 534, 255, 53/252, 249, 250, 260, 51; 271/108; 414/298.9; 227/112, 147

(56) References Cited

U.S. PATENT DOCUMENTS

| 4,151,944 A | * | 5/1979 | Picton ......................... 227/120 |
| 4,574,556 A | * | 3/1986 | Schmidt et al. ................. 53/69 |
| 4,781,318 A | * | 11/1988 | Meyers .......................... 227/67 |
| 4,996,820 A | | 3/1991 | Harrison, Jr. |
| 5,289,666 A | * | 3/1994 | Hamilton ...................... 53/252 |
| 5,395,103 A | * | 3/1995 | Gysi et al. ..................... 271/11 |
| 5,953,887 A | * | 9/1999 | Lucas et al. ................... 53/534 |

FOREIGN PATENT DOCUMENTS

DE         19546368 A1        6/1996

* cited by examiner

Primary Examiner—Rinaldi I. Rada
Assistant Examiner—Thanh K. Truong
(74) Attorney, Agent, or Firm—Young & Thompson

(57) ABSTRACT

Device and method for inserting an information carrier in a substrate. The information carriers are stored in a storage and with the aid of transfer means are removed one by one from said storage with the aid of vacuum. The transfer means then place the information carrier concerned in the insertion element, which then executes the insertion stroke.

6 Claims, 4 Drawing Sheets

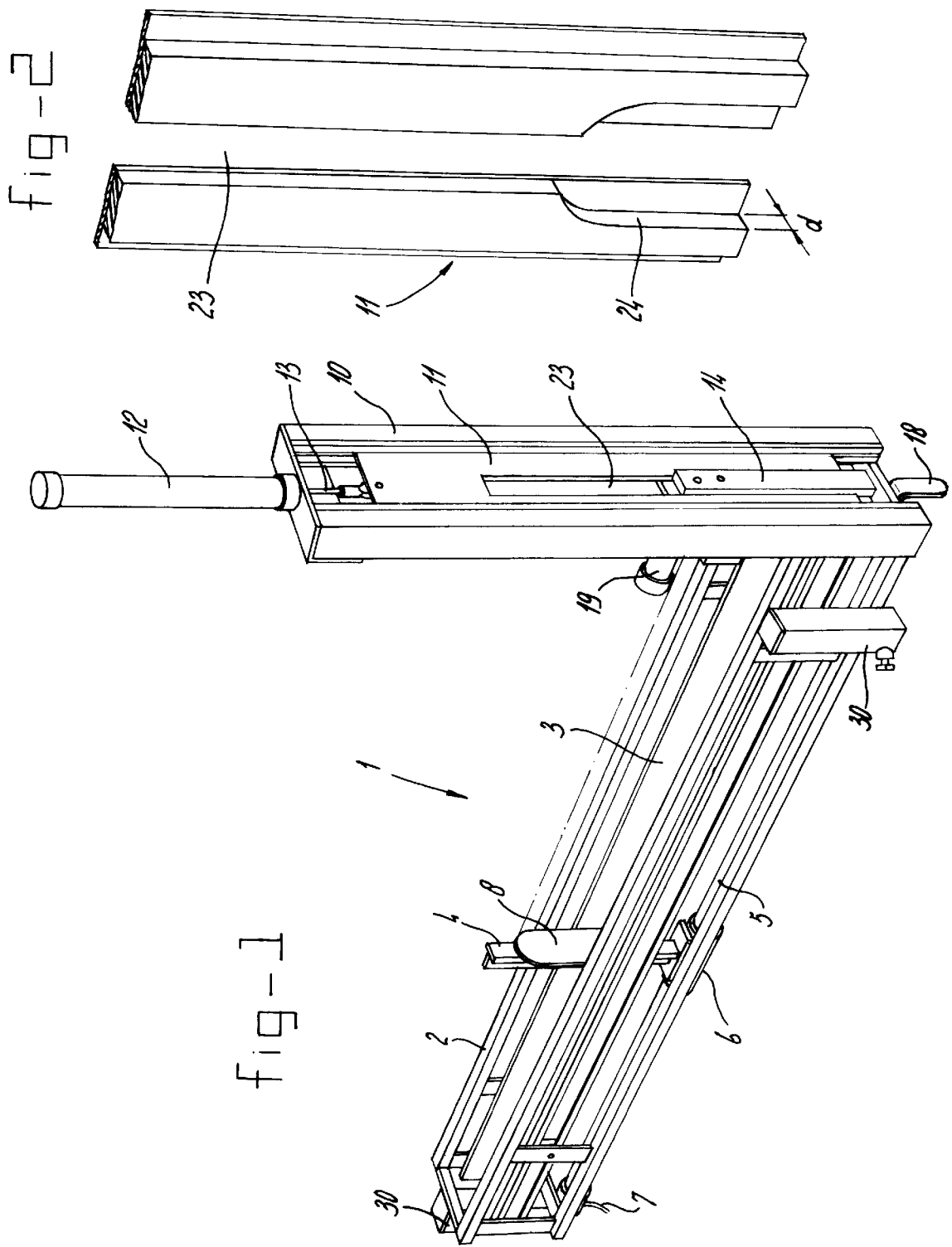

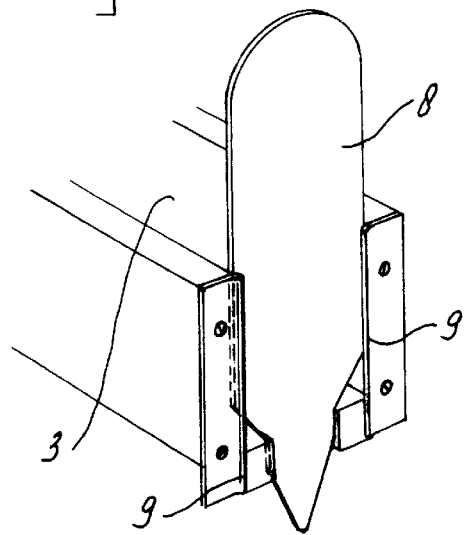
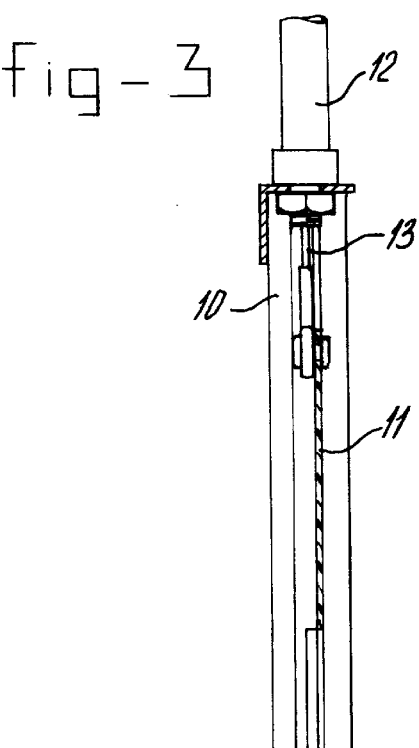
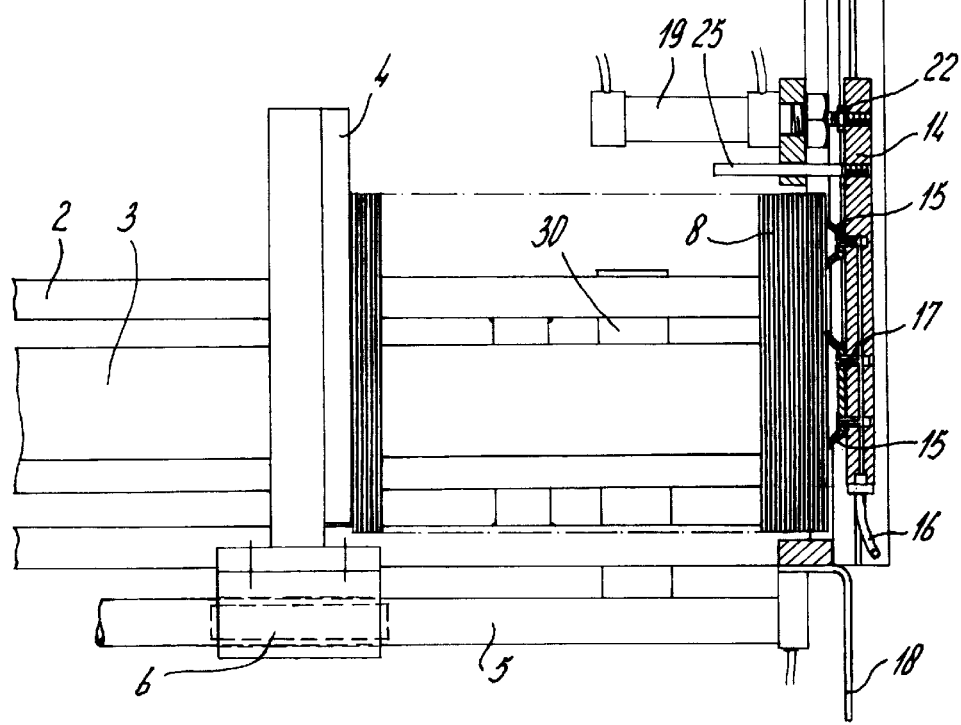

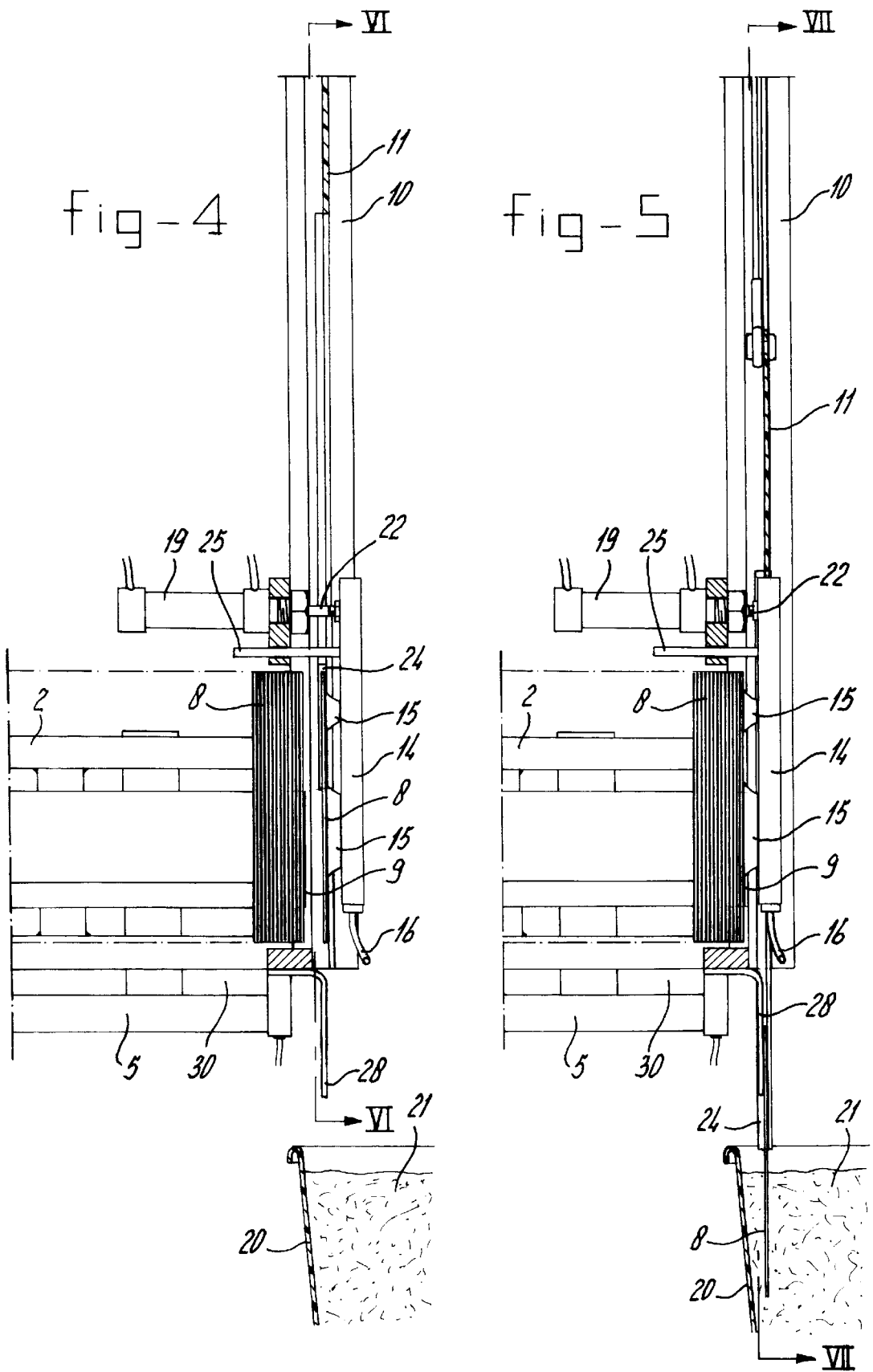

DEVICE AND METHOD FOR INSERTING AN INFORMATION CARRIER

BACKGROUND OF THE INVENTION

The present invention relates to a device for inserting information carriers in a substrate, comprising a frame provided with a feed for information carriers as well as a reciprocating insertion element provided with an accommodation for information carriers, which insertion element is provided with engagement means for information carriers and moves the latter from the feed into the substrate, vacuum means being provided to bring the information carriers to the insertion element. A device of this type is disclosed in U.S. Pat. No. 4,574,556. It is now very common to provide (pot) plants and other products with information carriers. Some information carriers can comprise a relatively thin part having a pointed end that can be inserted into a somewhat deformable substrate such as potting compost. The aim in the prior art is to perform this insertion mechanically as far as possible. The numbers of information carriers which have to be inserted are increasing all the time and the demands imposed on the processing speed are becoming increasingly stringent.

U.S. Pat. No. 4,574,556 A describes a device in which the vacuum means are mounted on the insertion element. That is to say vacuum is applied when the accommodation for information carriers in the insertion element is moved past the storage and in this way the leading information carrier from a series is picked up and inserted into the substrate by the insertion element. Although it is possible by this means largely to prevent more than one information carrier being placed in the substrate at the same time or no information carrier at all being placed in the substrate, this existing device has a large number of disadvantages. Firstly, the peripheral edge of the accommodation for the information carriers must be accurately matched to the thickness thereof. After all, if this were to be several times the thickness of the leading information carrier and for whatever reason a second information carrier moves with the leading information carrier over the very small distance which the latter travels, two information carriers are picked up, which leads to jamming and damage. This means that support for the desired information carriers is very limited. The thickness of such information carriers is between 0.2 and 1.5 mm and is more particularly approximately 0.5 mm. Furthermore, it is necessary to take measures to mount the vacuum means on the insertion element. The weight of the latter increase as a result, as a result of which a high processing speed is precluded.

SUMMARY OF THE INVENTION

The aim of the present invention is to overcome these disadvantages. This aim is achieved with a device for inserting information carriers in a substrate, comprising a frame provided with a feed for information carriers as well as a reciprocating insertion element provided with an accommodation for information carriers, which insertion element is provided with engagement means for information carriers and moves the latter from the feed into the substrate, vacuum means being provided to bring the information carriers to the insertion element, said vacuum means comprising transfer means which can be moved relative to the frame and which transfer the information carriers from said feed to said insertion element. According to one aspect of the invention the vacuum means are separate from the insertion element. This is to say, vacuum means pick up the information carrier concerned and move the latter over a considerable distance to the accommodation in the insertion element. Consequently it is possible to opt for the peripheral edge of the accommodation in the insertion element being substantially higher than the thickness of the information carrier, as a result of which particularly good engagement is ensured. Moreover, in this way it is possible to insert the information carrier in a somewhat curved position into the accommodation in the insertion element, without there being any fear of movement out of the insertion element. As a result of the somewhat curved positioning of information carriers it is possible under certain circumstances to obtain a better insertion. After all, the rigidity of a somewhat curved thin sheet is increased in a direction perpendicular to the curvature.

By separating the vacuum means, that is to say the transfer means, from the insertion element the weight of the insertion element can be kept low and the construction thereof can be kept simple. High clock speeds can be achieved as a result. Moreover, it is now possible to hold the information carriers firmly at the end of the storage storage. An appreciable vacuum can be generated because the transfer means can be moved until they are in contact with the leading information carrier. In the case of the device according to U.S. Pat. No. 4,574,556 such a construction is much more difficult and the information carriers will be held less firmly, as a result of which there is a risk that the information carriers escape or become damaged in an undesirable manner.

Preferably, the insertion element is provided with an opening over a substantial proportion of the length thereof, through which opening the transfer means are able to move. This opening is smaller than the accommodation for the information carriers. This opening is located upstream, viewed in the insertion direction, of the accommodation. Consequently it is possible to move the transfer means through the insertion element and to pick up an information carrier during the insertion operation, when an information carrier is present in the accommodation. On the return stroke of the insertion element, the transfer movement of the transfer means takes place at the point in time when the accommodation in the insertion element is in the correct position, that is to say the information carrier is placed in the accommodation concerned. As a result of these measures the time for transferring the information carriers is longer and in fact no longer forms part of the clock time for the insertion element, as a result of which the capacity thereof can be increased appreciably.

Because the insertion element according to the present invention has no other function than to move the information carrier up and down and the accommodation can be made of appreciable size, it is possible to manufacture the insertion element from, for example, a plastic material in a simple manner. As a result the weight of the insertion element decreases and the clock time can be increased.

According to a further aspect the invention also relates to a method for, with the aid of vacuum, bringing information carriers originating from a feed into an insertion element of a device for inserting said information carriers in a substrate, wherein the first information carrier of a series is picked up by vacuum and transferred into the accommodation for information carriers in said insertion element, after which said vacuum is released.

More particularly, the picking up and movement of the information carrier by the vacuum means, which has been described above, takes place during the downward or return stroke of the insertion element, by the transfer means.

The invention will be explained in more detail below with reference to an illustrative embodiment shown in the drawing. In the drawing:

BRIEF DESCRIPTION OF THE DRAWINGS

FIG. 1 shows a perspective view of the device according to the invention;

FIG. 2 shows, in perspective, a detail of the insertion element according to the invention;

FIG. 3 shows a side view, partially in section, of the device according to the invention when picking up a first information carrier from a series;

FIG. 4 shows the placing of said information carrier in the accommodation in the insertion element;

FIG. 5 shows the insertion of the information carrier in a substrate;

FIG. 8 shows, in perspective, a detail of the end of the storage for information carriers.

DETAILED DESCRIPTION OF A PREFERRED EMBODIMENT

Figure 6:
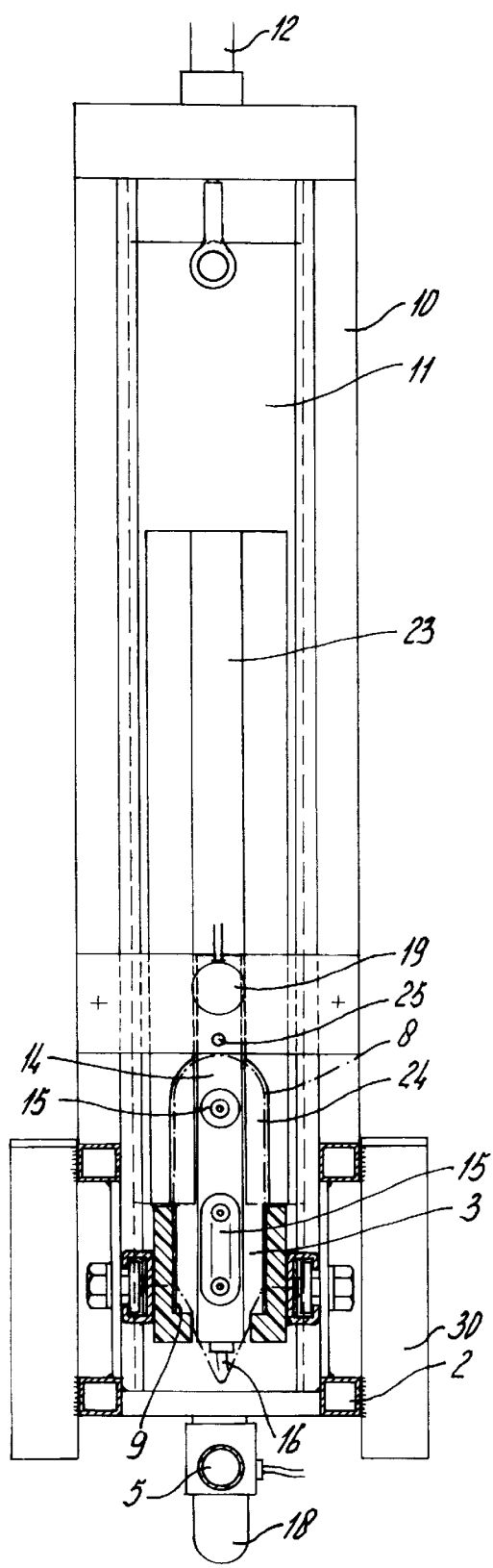
FIG. 6 shows a section along line VI—VI in FIG. 4.
Figure 7:
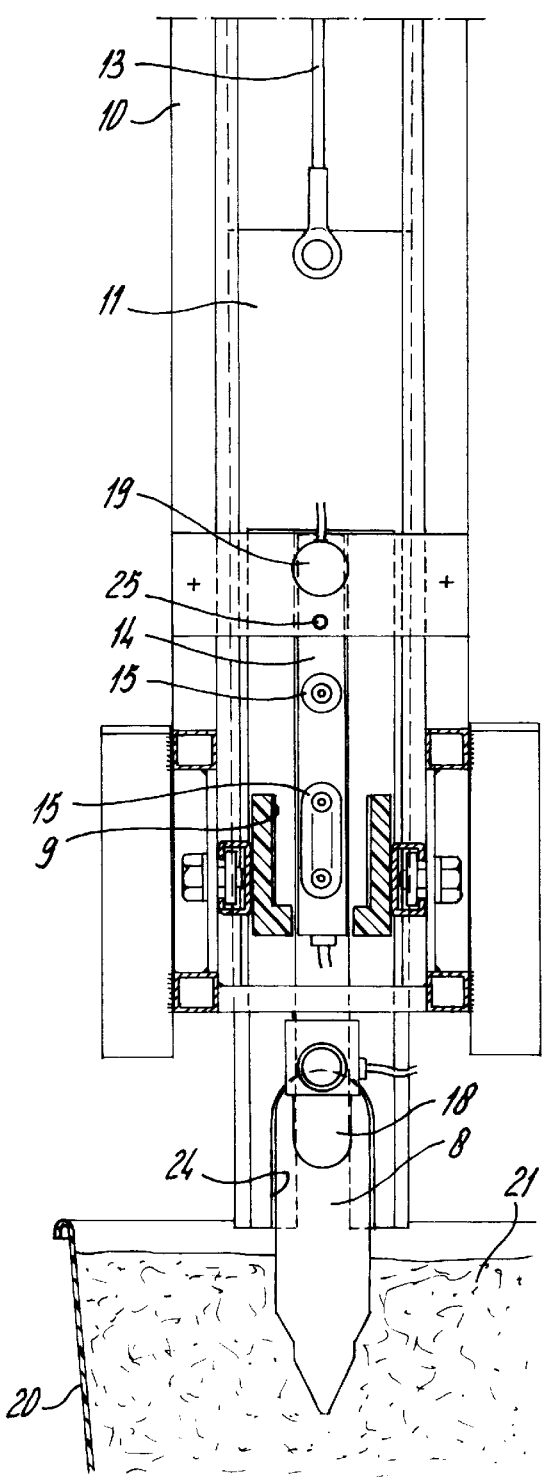
FIG. 7 shows a section along line VII—VII in FIG. 5.

The device according to the invention is indicated in the drawings by 1. This device consists of a frame 2 provided with fixings 30 on, for example, a mobile subframe or any other construction which is located in the vicinity of, for example, a conveyor belt on which, for example, pots, which may or may not contain plants, are transported, in which information carriers 8 have to be inserted.

The frame 2 is provided with a storage 3 for information carriers 8. A finger 4 is provided which is connected to a cylindrical slider 6 around a hollow rod 5. A piston, on which pressure can be applied with the aid of line 7, is located inside rod 5. By means of magnetic coupling between the piston located in the interior of rod 5 and the cylindrical slider 6, a thrust, which is directed towards the right in FIG. 1, is thus generated on finger 4.

As can be seen from FIG. 8, the end of storage 3 is provided with retaining lips 9. The latter are of somewhat resilient construction. With this arrangement the thrust applied to finger 4 is such that one information carrier 8 is always held between the retaining lips 9 but is not so high that said information carrier 8 travels past the retaining lips 9 on its own.

A vertical section 10, within which a reciprocating insertion element 11 is located, is mounted at the end of frame 2. Operation thereof is possible with the aid of a cylinder 12 and a piston rod 13, which is connected to a piston which is located inside the cylinder and is not shown.

Details of the insertion element 11 can be seen in FIG. 2. Insertion element 11 is preferably made of plastic material and is provided with an elongated slit 23, which merges into a accommodation 24 for information carriers 8 close to the bottom end. The height of the boundary wall indicated by d is approximately 4 mm. A pick-up plate indicated by 14 is shown in FIG. 1. Details of this can be seen from FIG. 3. The pick-up plate is provided with suction cups 15, the interior of which is in communication with vacuum channels 17 connected to vacuum supply 16. In FIG. 3 pick-up plate 14 can be moved from left to right by operation of operating cylinder 19 and piston rod 22. A guide pin 25 is provided. The insertion element is supported at the bottom of the frame with the aid of a guide lip 18. This lip 18 can optionally be constructed with a curved face so that the information carrier can be inserted into the substrate 21 in a concave manner. The substrate 21, placed in a pot 20, is shown in some of the figures. In the present example the substrate is, for example, potting compost. However, it will be understood that the invention is in no way restricted to this.

A control, which is not shown, is provided which coordinates the movement of the piston rods 13 and 22. If compressed air is used as the medium, quick-release vents can be fitted for rapid response, so that return strokes can be executed rapidly. Vacuum can be generated in line 16 in any manner known from the prior art, such as by means of a vacuum pump or with the aid of the venturi principle by using compressed air.

The device describe above functions as follows:

Starting with a storage 3 filled with information carriers, said information carriers are continually moved towards the right with the aid of finger 4 and the leading information carrier, and thus the remainder of the series of information carriers, is held by retaining lips 9. In the position in FIG. 3 the pick-up plate 14 has been moved to the left by operation of piston rod 22 and the suction cups 15 are positioned against the leading information carrier. Vacuum is then generated in the interior of the section cups 15 via line 16 and channel 17 and the leading information carrier concerned is picked up. The pick-up plate 14 is then moved to the right by operation of piston rod 22. This movement to the right takes place only when the accommodation 24 in insertion element 11 is in the correct position as is shown in FIG. 4. That is to say, the leading information carrier must be able to move unimpeded into accommodation 24. The vacuum is then interrupted and the suction cups release their hold. Piston rod 22 then optionally moves further to the right in order to detach the suction cups 15 from the leading information carrier. A separate step for this is not needed because further movement of the leading information carrier to the right is impended by the rear wall of accommodation 24. As soon as the vacuum is released, support plate 14 will automatically move away as a result of the residual pressure on piston rod 22, as a result of which rapid release of the leading information carrier is ensured. The insertion element 11 will then, as is shown in FIG. 5, move downwards by means of piston rod 13 and the leading information carrier is inserted in the substrate. As soon as the top of accommodation 24 is located below the bottom suction cup 15 on pick-up plate 14, it is possible to move the pick-up plate 14 back to the left through slit 23. This movement can be continued until the next information carrier has been picked up. If the insertion element then comes back into the position according to FIG. 4, the movement of the pick-up plate to the right, which possibly has already been initiated earlier, can be continued such that the next information carrier can be placed in accommodation 24. It will be understood that a very high clock speed can be achieved by this means.

Although the invention has been described above with reference to a preferred embodiment, it will be clear to those skilled in the art that numerous variations can be made. For instance, it is possible to install cylinder 19 on the other side of the insertion element, that is to say opposite the storage 3. This and further variants fall within the scope of the appended claims.

What is claimed is:

1. Device for inserting information carriers in a substrate, comprising a frame having a feed for information carriers, an insertion element provided with an accommodation for information carriers, which insertion element is provided with engagement means for information carriers and reciprocates on the frame to move information carriers in a first direction from the feed into the substrate, vacuum means to bring the information carriers to the insertion element, said vacuum means comprising transfer means movable in a second direction substantially perpendicular to said first direction and relative to the frame and the insertion element to transfer the information carriers from said feed to said insertion element, said insertion element having an opening adjoining the accommodation for information carriers, which opening is smaller than the accommodation for said information carriers and larger than said vacuum means, such that said vacuum means can be moved through said opening in the insertion element to said feed at the same time that an information carrier is being placed in a substrate.

2. Device according to claim 1, wherein said insertion element essentially consists of plastic material.

3. Device according to claim 1, wherein said feed comprises a storage.

4. Device according to claim 1, wherein said accommodation for information carriers borders and grips each information carrier over at least part of a side edge thereof, a height of said side edge being at least 1 mm.

5. Device according to claim 4, wherein said height is at least 3 mm.

6. Method for, with the aid of vacuum, bringing information carriers originating from a feed into an insertion element of a device for inserting said information carriers into a substrate, the first information carrier of a series being picked up by vacuum and transferred in a first direction into the accommodation for information carriers in said insertion element, after which said vacuum is released, and thereafter said information carriers are moved by said insertion element into a substrate in a second direction substantially perpendicular to said first direction, wherein a next information carrier is picked up by a vacuum during an insertion/return stroke of said insertion element.

* * * * *